United States Patent
Ghoshal et al.

(10) Patent No.: US 7,779,691 B2
(45) Date of Patent: Aug. 24, 2010

(54) ACOUSTIC METHOD AND APPARATUS FOR FRACTURE DETECTION OF BALL BEARINGS

(75) Inventors: Anindya Ghoshal, Middletown, CT (US); Ronald I. Holland, East Hampton, CT (US); Herbert A. Chin, Portland, CT (US); James L. Ambler, Stafford Springs, CT (US); Leroy H. Favrow, Newington, CT (US); Lucy M. Favrow, legal representative, Newington, CT (US); David A. Haluck, Stuart, FL (US)

(73) Assignee: United Technologies Corporation, Hartford, CT (US)

( * ) Notice: Subject to any disclaimer, the term of this patent is extended or adjusted under 35 U.S.C. 154(b) by 289 days.

(21) Appl. No.: 11/872,062

(22) Filed: Oct. 15, 2007

(65) Prior Publication Data

US 2009/0095083 A1      Apr. 16, 2009

(51) Int. Cl.
*G01N 29/14*   (2006.01)
*G01M 13/04*   (2006.01)

(52) U.S. Cl. .............................. 73/593; 73/799; 73/801

(58) Field of Classification Search ................. 73/587, 73/593, 799, 801
See application file for complete search history.

(56) References Cited

U.S. PATENT DOCUMENTS

| | | | | |
|---|---|---|---|---|
| 3,053,073 | A | * | 9/1962 | Baughman ..................... 73/7 |
| 3,106,837 | A | * | 10/1963 | Plumb et al. .................. 73/579 |
| 3,486,616 | A | * | 12/1969 | Brany et al. .................. 209/598 |
| 3,980,359 | A | | 9/1976 | Wetherbee |
| 4,567,769 | A | | 2/1986 | Barkhoudarian |
| 4,688,427 | A | | 8/1987 | Hyland |
| 4,928,527 | A | | 5/1990 | Burger |
| 4,995,259 | A | | 2/1991 | Khuri-Yakub |
| 5,005,417 | A | | 4/1991 | Kawasaki |
| 5,029,474 | A | | 7/1991 | Schulze |
| 5,062,296 | A | | 11/1991 | Migliori |
| 5,257,544 | A | * | 11/1993 | Khuri-Yakub et al. ......... 73/579 |
| 5,834,632 | A | | 11/1998 | Olender |
| 5,929,315 | A | | 7/1999 | Dunegan |
| 6,382,029 | B1 | | 5/2002 | Shoureshi |
| 6,399,939 | B1 | | 6/2002 | Sundaresan |
| 7,075,424 | B1 | | 7/2006 | Sundaresan |
| 2006/0101913 | A1 | | 5/2006 | O'Brien |

\* cited by examiner

*Primary Examiner*—Hezron Williams
*Assistant Examiner*—Rose M Miller
(74) *Attorney, Agent, or Firm*—Carlson, Gaskey & Olds PC

(57) ABSTRACT

A method for testing ball bearings includes applying a Hertzian contact stress on a ball bearing to provide a fracture of the ball bearing that releases acoustic energy, establishing a signal representing the acoustic energy, and identifying occurrence of the fracture based upon the signal.

15 Claims, 3 Drawing Sheets

ACOUSTIC METHOD AND APPARATUS FOR FRACTURE DETECTION OF BALL BEARINGS

BACKGROUND OF THE INVENTION

This invention relates to ball bearing testing and, more particularly, to acoustic detection of fracture of ball bearings.

Ball bearings are commonly used in rotating components, such as servomotors, bicycles, rotors, gas turbine engines and the like. The ball bearings may be manufactured from any of a variety of different materials, such as ceramic or metal alloy, depending upon the desired characteristics of the ball bearings. Manufacturing of the ball bearings is typically tightly controlled to achieve desired ball bearing characteristics. For example, a material composition of the ball bearings and processing steps for forming the ball bearings may be controlled to achieve the desired characteristics. If the composition deviates from the nominal composition or if the parameters of the processing steps deviate from predetermined tolerances, the ball bearing characteristics may be outside of a desirable range.

Typically, after manufacturing, one or more representative sample ball bearings are selected from a group of ball bearings for testing to determine if the composition or the process parameters have deviated. For example, a change in the composition or a change in a processing parameter may change the fracture strength of the ball bearing. One conventional method of determining whether the composition or processing has deviated is to measure the fracture strength by compressing the ball bearing between two platens in a load testing machine until the ball bearing fractures. The fracture strength may then be compared with a predetermined strength range to determine whether the ball bearing represents acceptable composition and process parameter variations.

One drawback associated with such testing is that ball bearings are often designed to have a relatively high stiffness. For example, ceramic ball bearings may have a higher stiffness than the stiffness of the load testing machine used to test the ball bearings. As a result, the measurements of the load testing machine may be inaccurate and thereby negatively influence reliability of ball bearing quality testing.

Accordingly, there is a need for an assembly and method for testing ball bearings that provides accurate measurement of ball bearing fracture characteristics while avoiding the problems associated with the stiffness of the load testing machine.

SUMMARY OF THE INVENTION

An example method for testing ball bearings includes applying a Hertzian contact stress on a ball bearing to produce a fracture of the ball bearing that releases acoustic energy, establishing a signal representing the acoustic energy, and identifying occurrence of the fracture based on the signal.

In another aspect, the method for testing the ball bearings includes arranging a first ball bearing to be in contact with a second ball bearing, loading the ball bearings to produce a fracture that releases acoustic energy, and transmitting the acoustic energy to a sensor using a waveguide.

An example arrangement for testing the ball bearings includes a fixture body. The fixture body includes a cylindrical opening and a waveguide passage. The cylindrical opening includes a first open end for association with a first compression member, a second open end for association with a second compression member, and an intermediate section between the ends for receiving at least one test ball bearing. The waveguide passage extends from the intermediate section.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
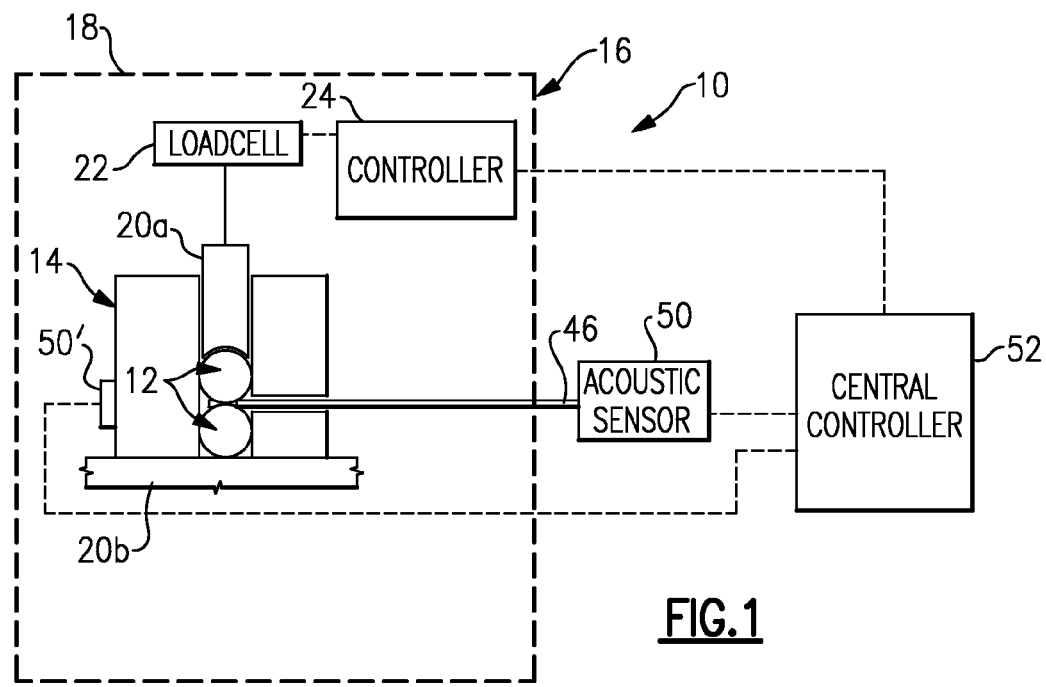
FIG. 1 illustrates selected portions of an example testing arrangement.

FIG. 1 illustrates selected portions of an example testing arrangement 10 for evaluating ball bearings 12. In this example, the testing arrangement 10 acoustically detects fracture of at least one of the ball bearings 12 for determining a fracture characteristic such as fracture strength, fracture toughness, or other fracture-related characteristic of the ball bearings 12. For example, the testing arrangement 10 may be used to test sample ball bearings 12 as a quality measure of the composition and manufacturing process of the ball bearings 12.

In the disclosed example, the testing arrangement 10 includes a fixture 14 for positioning the ball bearings 12 in a desired test configuration to provide a Hertzian contact stress between the ball bearings 12. The fixture 14 is mounted within a load testing machine 16 (shown schematically) for applying a compressive load on the ball bearings 12.

The load testing machine 16 includes a frame 18 that supports a first compression member 20a and a second compression member 20b. At least one of the compression members 20a or 20b is associated with a load cell 22 that detects a load applied to the compression members 20a and 20b. The load cell 22 communicates with a controller 24, which may be a computer or the like for processing and/or displaying load data from the load cell 22. Other types of load testing machines having different configurations than shown may alternatively be used.

Figure 2:
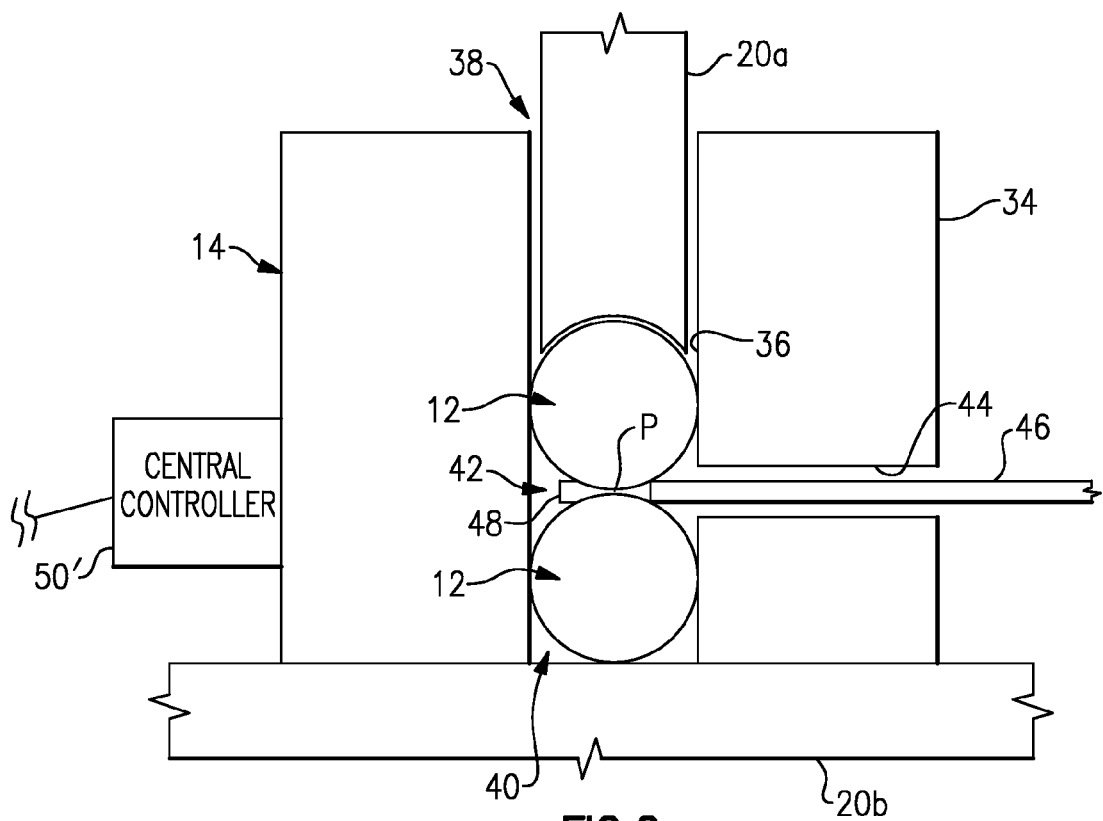
FIG. 2 illustrates a cross-sectional view of an example fixture for testing ball bearings.
Figure 3:
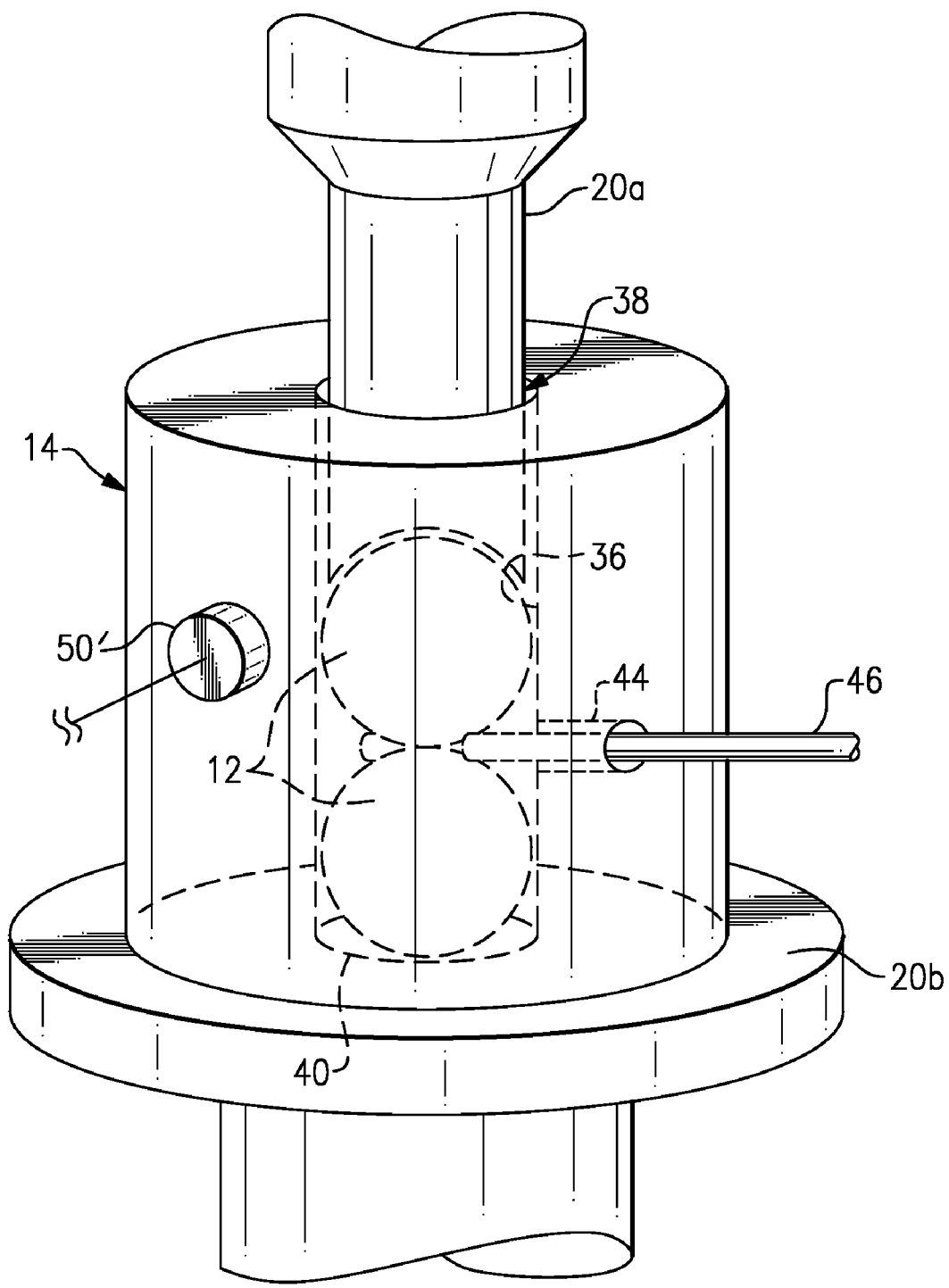
FIG. 3 illustrates a perspective view of the example fixture.

Referring to FIGS. 2 and 3, the fixture 14 includes a fixture body 34 having a cylindrical opening 36. In the disclosed example, the cylindrical opening 36 extends vertically within the fixture body 34 and defines a first open end 38 for receiving the first compression member 20a and a second open end 40 for association with the second compression member 20b. An intermediate section 42 is located between the open ends 38 and 40 and receives the ball bearings 12 for testing.

In one example, the fixture body 34 is made of a polymeric material. For example, the polymeric material is polyamide. Polymeric material and polyamide provide a relatively low friction surface within the cylindrical opening 36 such that when the ball bearings 12 are compressed by the load testing machine 16, there is minimal friction loss between the ball bearings 12 and the surfaces of the cylindrical opening 36. Using a low friction material for the fixture body 34 thereby provides the benefit of reducing error that can contribute to inaccuracy of the testing results.

The fixture body 34 also includes a waveguide passage 44 that extends from the intermediate section 42. In the disclosed example, the waveguide passage 44 extends in a direction that is perpendicular to a central axis of the cylindrical opening 36. Given this description, one of ordinary skill in the art will recognize that the waveguide passage 44 may alternatively extend in different orientations relative to the cylindrical opening 36 than in the illustrated example.

Figure 4:
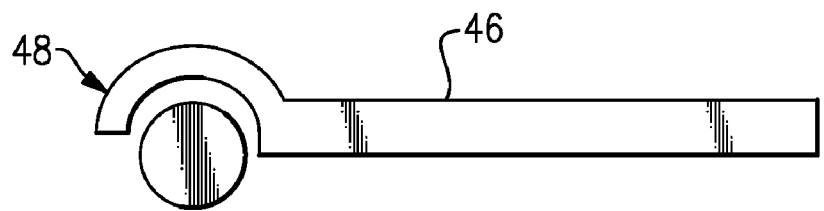
FIG. 4 illustrates an example waveguide for testing ball bearings.

A waveguide 46 is mounted on the frame 18 of the load testing machine 16 and extends within the waveguide passage 44. The waveguide 46 is mounted such that it does not touch side walls of the waveguide passage 44. Optionally, as shown in FIG. 4, the waveguide 46 includes a hooked end 48 that extends about a contact point P between the ball bearings 12. The waveguide 46 is connected at its other end to an acoustic sensor 50 that converts acoustic energy transmitted through the waveguide 46 into an electric signal. The acoustic sensor 50 is electrically connected with a central controller 52, such as an oscilloscope, that processes the electrical signal, as will be described below.

Optionally, a second acoustic sensor 50' may be mounted on a periphery of the fixture body 34 and electrically connected with the central controller 52 to further detect acoustic energy released from the ball bearings 12 during the compression testing.

In operation, the load testing machine 16 actuates the compression members 20a and 20b to compress the ball bearings 12 together to produce a Hertzian contact stress between the ball bearings 12. The compressive load is gradually increased at a pre-selected rate at least until the Hertzian contact stress on the ball bearings 12 causes a fracture of at least one of the ball bearings 12. The fracture releases acoustic energy. For example, the acoustic energy released includes an acoustic frequency below about 150 KHz. In a further example, the acoustic frequency is about 50-100 KHz.

The testing arrangement 10 of the illustrated examples provides the benefit of being able to acoustically detect occurrence of the fracture and the fracture load which caused the fracture. The disclosed testing arrangement 10 uses contact between relatively equally stiff ball bearings 12 to provide Hertzian contact stress and thereby reduce error that is typically associated with stiffness differences between the ball bearings and a load testing machine. Other methods that measure fracture solely through use of a load testing machine or through acoustic sensors that are located relatively far away from a test ball bearing may be less accurate than the illustrated testing arrangement 10 because of the difference in stiffness between the ball bearings and the load testing equipment, or an inability to accurately acoustically detect the acoustic energy at the remote location of the acoustic sensor.

In the illustrated example, the waveguide 46 is located near the contact point P between the ball bearings 12. The hooked end 48 of the waveguide 46 extends at least partially around the contact point P to provide enhanced detection of acoustic energy released when a fracture of one of the ball bearings 12 occurs. Upon fracture, released acoustic energy is transmitted through the waveguide 46 to the acoustic sensor 50. Non-contact between the waveguide 46 and the walls of the waveguide passage 44 as described above provides the benefit of enhancing acoustic energy transmittance because the acoustic energy is not absorbed by the walls of the test fixture 14. The acoustic sensor 50 converts the acoustic energy into an electric signal and transmits the electric signal to the central controller 52.

Figure 5:
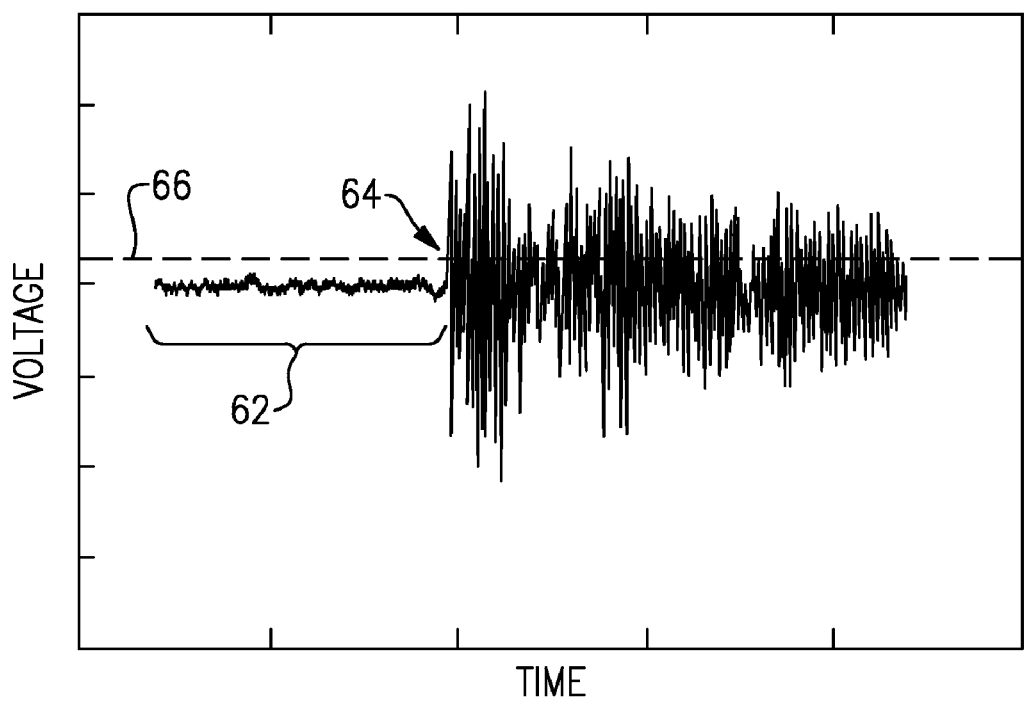
FIG. 5 illustrates an example graph of an electric signal representing acoustic energy released from a fracture of a ball bearing.

FIG. 5 illustrates an example graph of the electric signal (e.g., voltage) over time. Initially, in section 62 of the graph, fracture has not yet occurred and the signal is relatively constant. Near the time represented at 64, the fracture occurs and causes a change in the electric signal that represents the acoustic energy released by fracture of the ball bearings 12.

In the illustrated example, the central controller 52 is programmed to capture the load exerted on the ball bearings 12 upon occurrence of the fracture. Programming the central controller 52 may occur through manual input into the oscilloscope, adjustment of electrical hardware of the central controller 52, manual input into a software program of the central controller 52, or use of another suitable programmable feature.

In the disclosed example, the central controller 52 is programmed with a threshold 66, such as a threshold voltage. When the signal exceeds the threshold 66, the central controller 52 is triggered to capture the load data from the controller 24 of the load testing machine 16. The threshold 66 may be set at a predetermined level depending upon the expected amplitude of the electrical signal from occurrence of the fracture relative to the relatively constant level of the electrical signal before fracture. Thus, the electrical signal exceeding the threshold 66 triggers the central controller 52 to read or capture the load from the load testing machine 16, thereby identifying occurrence of the fracture and determination of the fracture load of the ball bearings 12.

As can be appreciated, the fracture load can be used to determine a fracture strength, fracture toughness, or other fracture-related characteristic of the ball bearings 12. The strength, toughness, or other characteristic can then be used as a quality measure representing the composition of the ball bearings 12, the processing parameters of the ball bearings 12, or other such characteristic. For example, the strength, toughness, or other characteristic may be compared with a predetermined range or tolerance to determine the quality of the ball bearings 12.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for testing ball bearings, comprising:
   arranging a first ball bearing to be in contact with a second ball bearing;
   loading the first ball bearing against the second ball bearing to produce a ball bearing fracture that releases acoustic energy; and
   transmitting the acoustic energy to a sensor using a waveguide.

2. The method as recited in claim 1, further including arranging the first ball bearing and the second ball bearing in a fixture including a cylindrical opening and a waveguide passage, the cylindrical opening having a first open end for association with a first compression member, a second open end for association with a second compression member, and an intermediate section between the ends for receiving the first ball bearing and the second ball bearing, and the waveguide passage extending from the intermediate section.

3. The method as recited in claim 2, further including arranging the waveguide within the waveguide passage such that the waveguide does not contact walls of the waveguide passage.

4. The method as recited in claim 3, further including mounting the waveguide and the sensor from a support that is spaced apart from the fixture.

5. The method as recited in claim 1, further including electrically connecting the sensor with a controller that receives a signal from the sensor that represents the acoustic energy.

6. The method as recited in claim 5, further including connecting the controller with a load testing machine for transmitting a load signal representing a load on the first ball bearing to the controller.

7. An arrangement for testing ball bearings, comprising:
a fixture body having a cylindrical opening and a waveguide passage, the cylindrical opening having a first open end for association with a first compression member, a second open end for association with a second compression member, and an intermediate section between the ends for receiving at least one test ball bearing, and the waveguide passage extends from the intermediate section.

8. The arrangement as recited in claim 7, wherein the waveguide passage is perpendicular to the cylindrical opening.

9. The arrangement as recited in claim 7, wherein the fixture body comprises a polymer.

10. The arrangement as recited in claim 7, wherein the fixture body comprises polyamide.

11. The arrangement as recited in claim 7, further including a waveguide extending through the waveguide passage such that the waveguide does not contact walls of the waveguide passage.

12. The arrangement as recited in claim 11, further including an acoustic sensor coupled with the waveguide for providing a signal representing an acoustic energy.

13. The arrangement as recited in claim 12, further including another acoustic sensor mounted on a periphery of the fixture body.

14. The arrangement as recited in claim 7, further including a controller in communication with the sensor, the controller being preset to communicate with a load testing machine in response to the signal exceeding a predetermined threshold.

15. The arrangement as recited in claim 14, wherein the controller comprises an oscilloscope.

* * * * *